US010115963B2

(12) United States Patent
Matsubara et al.

(10) Patent No.: US 10,115,963 B2
(45) Date of Patent: Oct. 30, 2018

(54) NEGATIVE ELECTRODE MATERIAL FOR SECONDARY BATTERY AND SECONDARY BATTERY USING THE SAME

(71) Applicant: LG Chem, Ltd., Seoul (KR)

(72) Inventors: Keiko Matsubara, Tokyo (JP); Yoshiyuki Igarashi, Tokyo (JP)

(73) Assignee: LG Chem, Ltd. (KR)

( * ) Notice: Subject to any disclaimer, the term of this patent is extended or adjusted under 35 U.S.C. 154(b) by 80 days.

(21) Appl. No.: 15/102,751

(22) PCT Filed: Dec. 10, 2014

(86) PCT No.: PCT/KR2014/012150
§ 371 (c)(1),
(2) Date: Jun. 8, 2016

(87) PCT Pub. No.: WO2015/088248
PCT Pub. Date: Jun. 18, 2015

(65) Prior Publication Data
US 2017/0018763 A1    Jan. 19, 2017

(30) Foreign Application Priority Data

Dec. 10, 2013    (JP) .................................. 2013-255238

(51) Int. Cl.
| | |
|---|---|
| *H01M 4/36* | (2006.01) |
| *H01M 4/58* | (2010.01) |
| *H01M 10/05* | (2010.01) |
| *H01M 4/13* | (2010.01) |
| *H01M 4/62* | (2006.01) |
| *H01M 4/587* | (2010.01) |
| *H01M 10/052* | (2010.01) |
| *H01M 4/134* | (2010.01) |
| *H01M 4/38* | (2006.01) |
| *H01M 4/133* | (2010.01) |
| *H01M 4/1393* | (2010.01) |
| *H01M 4/1395* | (2010.01) |
| *H01M 10/0525* | (2010.01) |
| *H01M 4/02* | (2006.01) |

(52) U.S. Cl.
CPC ........... *H01M 4/364* (2013.01); *H01M 4/133* (2013.01); *H01M 4/134* (2013.01); *H01M 4/1393* (2013.01); *H01M 4/1395* (2013.01); *H01M 4/366* (2013.01); *H01M 4/386* (2013.01); *H01M 4/587* (2013.01); *H01M 4/625* (2013.01); *H01M 10/052* (2013.01); *H01M 10/0525* (2013.01); *H01M 2004/027* (2013.01)

(58) Field of Classification Search
CPC ....... H01M 4/386; H01M 4/587; H01M 4/625
See application file for complete search history.

(56) References Cited

U.S. PATENT DOCUMENTS

| | | | |
|---|---|---|---|
| 5,395,711 A | 3/1995 | Tahara et al. | |
| 6,589,694 B1* | 7/2003 | Gosho | ................ C01G 45/1228 429/212 |
| 2004/0062990 A1 | 4/2004 | Shimamura et al. | |
| 2004/0248011 A1* | 12/2004 | Asao | ..................... H01M 4/134 429/231.95 |
| 2008/0020926 A1 | 1/2008 | Guillaume et al. | |
| 2008/0076017 A1* | 3/2008 | Takezawa | ............. B22F 1/0003 429/129 |
| 2008/0096110 A1 | 4/2008 | Bito et al. | |
| 2008/0113271 A1* | 5/2008 | Ueda | ..................... H01M 4/134 429/231.95 |
| 2008/0118835 A1 | 5/2008 | Hur et al. | |
| 2008/0286657 A1* | 11/2008 | Hasegawa | ............. H01M 4/364 429/338 |
| 2008/0302999 A1 | 12/2008 | Matsubara et al. | |
| 2012/0264015 A1 | 10/2012 | Jung et al. | |

FOREIGN PATENT DOCUMENTS

| | | |
|---|---|---|
| EP | 1873846 A1 | 1/2008 |
| JP | H06325765 A | 11/1994 |
| JP | 2004103340 A | 4/2004 |
| JP | 2006253126 A | 9/2006 |
| JP | 2007335283 A | 12/2007 |
| JP | 200823524 | 2/2008 |
| JP | 2009245940 A | 10/2009 |

(Continued)

OTHER PUBLICATIONS

International Search Report from PCT/KR2014/012150, dated Apr. 6, 2015.
Doh, Chil-Hoon, et al., "A New Composite Anode, Fe—Cu—Si/C for Lithium Ion Battery," Journal of Alloys and Compounds, Aug. 11, 2008, vol. 461, Nos. 1-2, pp. 321-325.
Supplementary European Search Report for Application No. EP14870126 dated May 18, 2017.

*Primary Examiner* — Matthew J Merkling

(74) *Attorney, Agent, or Firm* — Lerner, David, Littenberg, Krumholz & Mentlik, LLP

(57) ABSTRACT

A negative electrode active material is provided, which can reduce and suppress ratio of expansion of silicon, provide enhanced conductivity, and realize superior charge/discharge cycle characteristic. The negative electrode material for secondary battery capable of occluding and releasing lithium consists of alloy particles having a silicon phase and a metal phase, and a carbonaceous material, in which crystallite size of the silicon phase is 10 nm or less, and the metal phase includes two or more kinds of metals alloying with silicon but not with lithium, and the carbonaceous material has crystallite size of 30 nm or more, and the carbonaceous material is present on the surface of, or within the alloy particles.

15 Claims, No Drawings

(56) References Cited

FOREIGN PATENT DOCUMENTS

| | | | |
|---|---|---|---|
| JP | 2013168328 | A | 8/2013 |
| KR | 100698361 | B1 | 3/2007 |
| KR | 20080009269 | A | 1/2008 |
| KR | 100814329 | B1 | 3/2008 |
| KR | 20110135342 | A | 12/2011 |

\* cited by examiner

NEGATIVE ELECTRODE MATERIAL FOR SECONDARY BATTERY AND SECONDARY BATTERY USING THE SAME

CROSS-REFERENCE TO RELATED APPLICATION

This application is a national phase entry under 35 U.S.C. § 371 of International Application No. PCT/KR2014/012150, filed Dec. 10, 2014, which claims priority to Japanese Patent Application No. 2013-255238, filed Dec. 10, 2013, the disclosures of which are incorporated herein by reference.

TECHNICAL FIELD

The present disclosure relates to a negative electrode material for a secondary battery, and a secondary battery using the same.

BACKGROUND ART

Recent development and distribution of mobile tools and electric motors have led into increased demand for high-capacity energy sources such as lithium secondary batteries, for representative example. At present, carbon material such as graphite, hard carbon, etc. is used for the negative electrode active material for the lithium secondary battery.

For example, graphite has a theoretical capacity of 372 mAh/g defined by the first stage structure $C_6Li$ formed by intercalation reaction, and it has been used in increasing amount to achieve higher capacity of the battery so far, but now reached the limit. Further, hard carbon may be used and may achieve capacity exceeding the theoretical capacity of graphite, but it can hardly realize high-capacity secondary battery, considering factors such as low initial efficiency, low electrode density, and so on. Considering the above, use of silicon for a negative electrode active material has been proposed, since silicon, as a novel material that can replace the carbon material, exhibits theoretical capacity as high as 4200 mAh/g by alloying with lithium.

Japanese Unexamined Patent Application Publication No. Hei 6-325765 (Patent Document 1) proposes lithium ion occluding and releasing material consisting of Li-containing silicon oxide or silicate. Use of silicon oxide mixed in a small amount with graphite has been commercialized, since the coexistence of amorphous or microcrystalline silicon phase and silicon oxide in single particles can provide relatively desired charge-discharge cycle characteristics. However, since silicon oxide has 20% or lower initial efficiency than graphite, if used in an increased mixing amount, it will disrupt initial efficiency balance with the positive electrode. Further, it becomes practically difficult to increase energy density.

Further, general understanding is that when silicon as well as silicon oxide is used as a negative electrode active material, silicon is pulverized due to repeated expansion and contraction during charging and discharging, thus resulting in generation of gaps within the electrode, which cut off conduction pathways and cause increased amount of silicon that does not contribute to charging and discharging and reduced battery capacity and deteriorated cycle characteristic.

Japanese Laid-Open Patent Application Publication No. 2004-103340 (Patent Document 2) proposes a solution to the issue associated with the use of high-capacity silicon-based material as the negative electrode active material, by forming expansion inhibiting phase by way of alloying Li-occluding metal such as silicon, tin, zinc, etc. with a Group 2A element or a transition metal, and also by microcrystallizing Li-occluding metal, thereby inhibiting cycle deterioration due to charging and discharging.

Further, Japan Laid-Open Patent Application No. 2008-023524 (Patent Document 3) proposes a negative electrode material for lithium ion secondary battery comprising a composite material which is treated to be imparted with compressive and shear forces and which has a structure in which silicon particles having carbonaceous film on at least a portion of the surfaces are in close contact with graphite material. According to Patent Document 3, close adhesion among metal particles and among metal particles and carbonaceous material prevents separation of the meta particles from one another, and separation of the metal particles from the carbonaceous material due to expansion and contraction that accompany charging and discharging. Accordingly, discharge capacity is higher than theoretical capacity (372 mAh/g) of graphite, and is considered to be the one that can provide a negative electrode material for lithium ion secondary battery having desired cycle characteristic and initial charge and discharge efficiency.

However, the suggestion of Patent Document 2 still suffers inefficient charging and discharging, because the surface of the alloy particles are apt to oxidize and has lower conductivity compared with carbonaceous material. Particularly at the end of discharging when electric resistance of the active material increases, the insufficient discharge causes retention of lithium ion inside near the surface of the particles, thus causing degradation of the battery. Further, when the binary or ternary elements alloying with Li during lithium ion intercalation and de-intercalation has metal element such as Al, and so on, there is a presence of a plurality of Li occlusion phases including silicon, and as a result, degradation is accelerated.

Further, regarding the suggestion of Patent Document 3, when crystalline silicon having considerably high expansion ratio is composited with graphite, due to 4-fold or greater difference of expansion ratio between the two, the expanded silicon falls, rather than staying only within the pores in the graphite, and thus the particle decay occurs. As a result, cycle deterioration can occur.

DISCLOSURE

Technical Problem

The present disclosure is designed to solve the problems of the related art, and therefore, it is urgently necessary to develop a negative electrode material for non-aqueous electrolyte secondary battery, which is a further improvement from a composite comprising a silicon phase expressing capacity, and a metal phase playing a role of suppressing silicon phase expansion.

Other objects and advantages of the present disclosure will be understood by the following description, and it is understood that these can be achieved by means, methods or a combination thereof which are defined in the claims.

Technical Solution

Regarding the alloy particles comprising a silicon phase and a metal phase alloying with the silicon phase, but not with lithium, the present inventors have found that when a negative active material is obtained by mechanically amorphicating or mycrocrystallizing at least the silicon phase and forming the particles to micro size, with the carbon particles being present on the surface of, or within the alloy particles, and mixing with graphite and is used for an negative electrode expansion of alloy particles and negative electrode is suppressed, and enhanced conductivity and uniform alloy particle dispersion within electrode are achieved, and desired cycle characteristic is obtained. The present disclosure is made based on the finding stated above.

Therefore, in one aspect of the present disclosure, there is provided a negative electrode material (i.e., composite) for a secondary battery capable of occluding and releasing lithium consists of alloy particles having a silicon phase and a metal phase, and a carbonaceous material, in which a crystallite size of the silicon phase is 10 nm or less, and the metal phase comprise two or more kinds of metals alloying with silicon, but not with lithium, and the carbonaceous material has the crystallite size of 30 nm or more, and the carbonaceous material is present on the surface of, or within the alloy particles.

Further, in another aspect of the present disclosure, there is provided a method for fabricating a negative electrode material for a secondary battery, including: preparing silicon, two or more kinds of metals alloying with silicon, but not with lithium, and a carbonaceous material, preparing a master alloy with the silicon and the two or more kinds of metals; subjecting the master alloy to a first mechanical alloying treatment to form microcrystallized alloy particles consisting of a silicon phase having a crystallite size of 10 nm or less, and a metal phase; and subjecting the microcrystallized alloy particles and the carbonaceous material to a second mechanical alloying treatment to introduce the carbonaceous material onto the surface of, or into the alloy particles.

In a secondary battery using a negative electrode material according to the present disclosure, microcrystallization suppresses the expansion due to charge within a yield stress range of silicon, while the metal phase not alloying with lithium further limits the expansion. Accordingly, it is possible to suppress pulverization occurring in charging and discharging on a higher level, and thus, maintain desired cycle characteristic without having deterioration of silicon utilization rate by repeated charging and discharging. Further, compositing with the carbonaceous material of high conductivity and atomization to obtain average particle diameter of 5 µm or lower can enable efficient alloying (intercalation) with lithium or dealloying (deintercalation), and enhance charge and discharge cycle characteristic on a higher level. Further, an electrode prepared by mixing active materials of different ratio of expansion, such as atomized alloy particles and graphite, and so on, can further suppress degradation such as overall expansion or peel-off of the battery, because in view of the fact that the alloy particles can easily disperse uniformly within the electrode, the ratio of expansion of the electrode can be more uniform and maintained as low as possible.

According to a fabricating method according to the present disclosure, by employing two treatments, i.e., the first mechanical alloying treatment and the second mechanical alloying treatment, the silicon phase can be microcrystallized to a nm-scale or below, and it is easy to load the carbonaceous material within and without the alloy powder and pulverize the same. As a result, the ratio of silicon expansion is reduced, expansion of electrode is suppressed, conductivity is enhanced, and uniform distribution of silicon particles in electrode is achieved, and a negative electrode material providing excellent charge/discharge cycle characteristics can be fabricated.

Advantageous Effects

The present disclosure gives the following effects. The ration of silicon expansion is reduced, expansion of electrode is suppressed, conductivity is enhanced, and uniform distribution of silicon particles in electrode is achieved, and a negative electrode material providing excellent charge/discharge cycle characteristics can be fabricated.

BEST MODE

Definitions (Crystallite)
The term 'crystallite' as used herein refers to a largest aggregate of particle considered as single crystal, and that one particle is assembled by a plurality of crystallites.
(Crystallite Size)
The crystallite size is calculated by substituting measures, obtained from X-ray diffractometer, into, for example, full width at half maximum (FWHM) and the Scherrer equation [$D(\text{Å})=K*\lambda/(\beta*\cos\theta)$]: where, K is an integer, $\lambda$ is X-ray wavelength, $\beta$ is diffraction line broadening according to a crystallite size, and $\theta$ is a diffraction angle $2\theta/\theta$].
(Volume Cumulative Particle Size Distribution)
The 'volume cumulative particle size distribution' refers to particle size distribution obtained based on one arbitrary powder group. When a cumulative curve is obtained from the particle size distribution with reference to the entire volume (100%) of the powder group, the diameters at 10%, 50% and 90% of the cumulative curve are expressed as 10% diameter, 50% diameter (cumulative middle diameter: median diameter), and 90% diameter (µm), respectively.
(Mechanical Alloying)
The 'mechanical alloying' refers to one of alloy powder forming methods, which is the method of fabricating homogeneous alloy particles retained in solid state, through solid-state reaction occurred by repeating mixing of two or more kinds of metal components (powders) and milling. Using mechanical energy, it is possible to obtain alloy powder with homogeneous compositions within the powders and less segregation, because two or more kinds of metal components (powders) can be alloyed/pulverized at a temperature below melting point thereof.
[Negative Electrode Material for Secondary Battery]
The negative electrode material for secondary battery is formed of alloy particles consisting of silicon phase, and metal phase, and carbonaceous material present on a surface of, or within the alloy particles.
(Silicon Phase)
Silicon phase refers to a single phase consisting of silicon and therefore, it does not contain other metal elements and components.

The silicon phase has a crystallite size of 10 nm or less, or preferably, 5 nm or less.

The silicon content with respect to the alloy particles is from 40 wt % to 85 wt %, preferably with a lower limit of 50 wt % or higher, or more preferably, 55 wt % or higher, and with an upper limit of 80 wt % or lower, or more preferably, 75 wt % or lower.

With reference to the weight (100) of silicon (in all forms) contained in the entire alloy particles, the ratio of silicon in a single phase consisting of silicon ('silicon phase') is from 20 wt % to 70 wt %, preferably with a lower limit of 30 wt % of higher and an upper limit of 50 wt % or lower, in which the ratio of silicon contained in the metal phase is from 30 wt % to 80 wt %, preferably with a lower limit of 50 wt % or higher, and an upper limit of 70 wt % or lower.

(Metal Phase)

The metal phase consists of two or more kinds of metals which alloy with silicon, but not with lithium.

The two or more kinds of metals' refers to a combination of two selected from the group consisting of Co, Cr, Cu, Fe, Mn, Mo, Ni, Ti, or preferably, to a combination of Ni, Ti, Fe, a combination of Cr, Ti, Fe, or a combination of Cr, Mn, Ti, or more preferably, to a combination of Ni, Ti, Fe.

The crystallite size of the metal phase other than silicon in the alloy particles is 30 nm or less, or preferably, 10 nm or less, or more preferably, 5 nm or less.

(Carbonaceous Material)

The carbonaceous material is present on the surface of, or within alloy particles. The carbonaceous material being 'present' on the surface of, or within the alloy particles is achieved by coating, adhesion, loading, impregnating, and so on, and the carbonaceous material may be present not only on the surface of or within the alloy particles, but also in the interstitial regions of crystals, and so on.

The carbonaceous material may include, for example, carbon atomic structure such as amorphous carbon, natural and artificial graphite, fullerene, carbon nanotube, Lonsdaleite, diamond, and so on, carbon fiber, carbon particles, and so on.

According to a preferred aspect of the present disclosure, the content of the carbonaceous material in the negative electrode material is from 1 wt % to 20 wt %, preferably with a lower limit of 3 wt % or higher, and an upper limit of 10 wt % or lower.

The carbonaceous material has crystallite size of 30 nm or more, or preferably, 50 nm or more in size.

It is preferable that the degree of crystallinity of carbonaceous powder as a raw material, before composition with alloy particles, is as high as possible to obtain not only superior life characteristic, but also high initial charge and discharge efficiency. Further, it is preferable to use carbonaceous material (preferably, graphite powder) that has a smaller specific surface area and higher initial efficiency. Since the specific surface area of the negative electrode material particles is kept from increasing, it is possible to suppress degradation of electrode density and increase battery capacity.

(Alloy Particles)

According to a preferred aspect of the present disclosure, the crystallite sizes of all phases included in the alloy particles is 30 nm or less, preferably, 10 nm or less, or more preferably, 5 nm or less, by X-ray diffraction measurement.

For example, the X-ray diffraction measurement may be done at a 2θ=10~89.5° range, using CuKα radiation (wavelength=1.5406 Å) with a Bruker X-ray diffractometer. Further, the crystallite size may be obtained using Scherrer equation based on the full width at half maximum (FWHM) of silicon single phase and metal phase.

<Volume Cumulative Particle Size Distribution>

According to a preferred aspect of the present disclosure, 50% diameter in the volume cumulative particle size distribution of the negative electrode material is from 1 μm to 5 μm. Further, the 90% diameter in the volume cumulative particle size distribution of the negative electrode material is 30 μm or less, preferably, 15 μm or less, or more preferably, 7 μm or less.

The 50% and 90% diameters in the volume cumulative particle size distribution may be obtained using Nikkiso laser diffraction particle size distribution analyzer, based on cumulative frequencies as measured after 3 min dispersion by embedded ultrasound.

[Fabricating Method of Negative Electrode Material for Secondary Battery]

A fabricating method according to the present disclosure has the characteristic of employing two-stage mechanical alloying treatment such as the first mechanical alloying treatment and the second mechanical alloying treatment, simultaneously upon preparing master alloy with the silicon and the two or more kinds of metals.

(Raw Materials)

The raw material such as silicon, two or more kinds of metals alloying with silicon but not with lithium, carbonaceous material, and so on are as described above in [Negative electrode material for secondary battery]

(Fabrication of Master Alloy)

According to the present disclosure, a process of fabricating a master alloy (powder) by preparing a master alloy with silicon and two or more kinds of metals is employed.

It is possible to achieve uniform amorphication or microcrystallization faster and more easily, by fabricating a master alloy and then performing the first mechanical alloying treatment, than by mixing starting powder and then performing the first mechanical alloying treatment. Further, unlike mechanical alloying, the method of preparing a master alloy has less limits in the sizes or shapes of silicon and metals of the raw material, and does not have ball component admixed as impurity, and therefore, can maintain high level of performance of the fabricated negative electrode material and battery characteristics.

According to a preferred aspect of the present disclosure, it is preferred to fabricate a master alloy of powder phase with the raw materials of silicon and two or more kinds of metals, by liquid quenching such as gas atomization or roll quenching, and so on, After then, the master alloy powder is provided for the two-stage mechanical alloying treatment.

Although there are differences depending on compositions and quenching rates, this treatment provides an advantage of forming a micro-structure, not as minute as microcrystalline size, but quite minute as 100 nm or less.

(Two-Stage Mechanical Alloying Treatment)

By employing the second mechanical alloying treatment after the first mechanical alloying treatment, it is possible to first amorphicate or microcrystallize the alloy particles and then to perform surface treatment by adding the carbonaceous material. This two-stage mechanical alloying treatment facilitates amorphication or microcrystallization of the alloy particles, prevents serious damages to the crystal structure of the carbonaceous material provided, and as a result, can impart conductivity while increasing initial efficiency of the secondary battery. Further, since there is no need to perform the treatment consistently for long hours, it is possible to avoid bonding among carbon and silicon, and thus can achieve high-capacity electrode while maintaining silicon phase.

(First Mechanical Alloying Treatment)

The present disclosure adopts a process of subjecting the fabricated master alloy to the first mechanical alloying treatment.

In order to ensure sufficient amorphication or microcrystallization of silicon, it is necessary to perform the first mechanical alloying treatment with higher power than the second mechanical alloying treatment. The conditions for the first mechanical alloying treatment may be determined properly according to types or scales of the equipment, and compositions.

On a small scale, the high power mechanical alloying treatment may be performed with a planetary ball mill capable of rotation and revolution motion, for example, but the desired first mechanical alloying treatment may be performed by others such as dry atritor, vibration mill, agitated ball mill, and so on. The overall conditions of the respective equipment, including an amount of master alloy powder, size or amount of ball mills, revolutions per minutes (RPM), frequency, and so on, are properly determined to the optimum and implemented so as to achieve silicon crystallite size of 10 nm or less.

(Second Mechanical Alloying Treatment)

The present disclosure adopts a process of obtaining a negative electrode material (particles) by subjecting the microcrystallized alloy particles and the carbonaceous materials to the second mechanical alloying treatment.

The carbonaceous material is introduced on the surface of, or within the alloy particles. The carbonaceous material being 'introduced' onto the surface of, or within the alloy particles may be achieved by coating, adhesion, loading, impregnating, and so on, and the carbonaceous material may be introduced not only onto the surface of or within the alloy particles, but also to the gaps of crystals, and so on.

By optimizing the treatment conditions for the second mechanical alloying, it is possible to obtain a negative electrode material (particles) including the carbonaceous material having 30 nm or larger crystallite size introduced onto the surface of, or within the alloy particles, and imparting conductivity and milling of the alloy particles are performed simultaneously. As a result, the electrode can have a uniform ratio of expansion and at the same time, maintain lowest ratio of expansion, and therefore, can further suppress degradation such as overall expansion or peel-off of the battery.

<Treatment Setting>

According to the present disclosure, the second mechanical alloying treatment is preferably performed under different conditions from the first mechanical alloying treatment. According to a preferred aspect of the present disclosure, the second mechanical alloying treatment is preferably performed with lower energy than the first mechanical alloying treatment.

By this treatment, it is possible to introduce carbonaceous material to the alloy particles without damaging structures of the alloy particles and the carbonaceous materials, respectively, to form a negative electrode material within a short time, and also, to mill the alloy particles to an average particle diameter of 5 µm or below, since the carbonaceous material can also act as a milling agent. In this case, the carbonaceous material is concurrently milled. While there may be differences depending on types of carbons used, considering general understanding that the alloy particles are less milled, the carbonaceous material will be more microcrystallized than the alloy particles, and the whole or part thereof will be introduced onto the surface of, or into the alloy particles. Further, it is possible to obtain a negative electrode material which maintains crystallinity of the carbonaceous material, and increase initial charge/discharge efficiency.

For a method of performing the second mechanical alloying treatment at a lower energy than the first mechanical alloying treatment, it is possible to use two different types of equipment with different powers, or use one same equipment while varying diameter and amount of balls, throughput, energy loads, or treatment times. Further, it is possible to use the homogeneous or heterogeneous equipment to perform the first mechanical alloying treatment and the second mechanical alloying treatment.

When the homogeneous (i.e., same) equipment is used, in order to make an accurate measurement of alloy particle-carbonaceous material ratios, and also in order to reduce size or amount of balls to thus reduce power for the mechanical alloying, it is preferable to perform the second mechanical alloying treatment after the first mechanical alloying treatment, i.e., after taking out the alloy particles from the equipment and modifying the setting.

Smaller-radius balls are preferably used for the second mechanical alloying treatment than the balls used for the first mechanical alloying treatment, and particles of desired size can be obtained by adjusting the radius and amount of the balls.

By using the smaller balls than those used for the first mechanical alloying treatment, it is possible to mill the alloy particles that are formed by the first mechanical alloying treatment, and thus produce uniform negative electrode material (particles). Accordingly, the negative electrode material of relatively higher ratio of expansion can be reduced in size and dispersed uniformly. As a result, when the negative electrode material is mixed with another active material (e.g., graphite) of different ratio of expansion to prepare an electrode, it is possible to maintain uniform ratio of expansion of the electrode irrespective of places.

[Negative Electrode for Secondary Battery]

According to the present disclosure, a negative electrode of (lithium) secondary battery having negative electrode material for secondary battery can be proposed. Further, according to a preferred aspect of the present disclosure, a negative electrode of secondary battery having carbon nanotube as a conducting agent can be proposed.

<Conducting Agent>

According to a more preferred aspect of the present disclosure, the conducting agent is included in an amount from 0.1 wt % to 5 wt % with respect to the total weight of negative electrode of a secondary battery, preferably with a lower limit of 0.5 wt % or higher, or more preferably, 1.0 wt % or higher.

[Secondary Battery]

According to the present disclosure, a secondary battery, or preferably, a lithium secondary battery is proposed, which includes a positive electrode, a negative electrode, a non-aqueous electrolyte, and a separator, in which the negative electrode is the negative electrode of secondary battery according to the present disclosure.

Generally, a lithium secondary battery includes a positive electrode consisting of a positive electrode active material and a positive electrode current collector, a negative electrode consisting of a negative electrode active material and a negative electrode current collector, and a separator which blocks electron conducting pathways between positive electrode and negative electrode to thus conduct lithium ions, in which Li salt-containing organic electrolyte to conduct lithium ions is injected into gaps of the electrodes and the separator material.

(Positive Electrode)

For the positive electrode active material, Li-containing transition metal oxide such as, for example, any one of, or a mixture of two or more kinds selected from the group consisting of $Li_xCoO_2$ ($0.5<x<1.3$), $Li_xNiO_2$ ($0.5<x<1.3$), $Li_xMnO_2$ ($0.5<x<1.3$), $Li_xMn_2O_4$ ($0.5<x<1.3$), $Li_x(Ni_aCo_b\text{-}Mn_c)O_2$ ($0.5<x<1.3$, $0<a<1$, $0<b<1$, $0<c<1$, $a+b+c=1$), $Li_xNi_{1-y}Co_yO_2$ ($0.5<x<1.3$, $0<y<1$), $Li_xCo_{1-y}Mn_yO_2$ ($0.5<x<1.3$, $0\leq y<1$), $Li_xNi_{1-y}Mn_yO_2$ ($0.5<x<1.3$, $0\leq y<1$), $Li_x(Ni_aCo_bMn_c)O_4$ ($0.5<x<1.3$, $0<a<2$, $0<b<2$, $0<c<2$, $a+b+$ c=2), $Li_xMn_{2-z}Ni_zO_4$ (0.5<x<1.3, 0<z<2), $Li_xMn_{2-z}Co_zO_4$ (0.5<x<1.3, 0<z<2), $Li_xCoPO_4$ (0.5<x<1.3), and $Li_xFePO_4$ (0.5<x<1.3) may preferably be used. Further, in addition to the Li-containing transition metal oxide, sulfide, selenide, halide, etc. may be used.

Further, a mixture of $Li_xCoO_2$ (0.5<x<1.3) and $Li_x(Ni_a Co_bMn_c)O_2$ (0.5<x<1.3, 0<a<1, 0<b<1, 0<c<1, a+b+c=1) may be used as the positive electrode active material. Specifically, $Li_x(Ni_aCo_bMn_c)O_2$ (0.5<x<1.3, 0<a<1, 0<b<1, 0<c<1, a+b+c=1) is preferable in view of the fact that it can exhibit high output characteristic at high voltage condition.

For example, the positive electrode is fabricated by applying a mixture of the positive electrode active material described above, the conducting agent and the binder on the positive electrode current collector, and drying the same. Depending on needs, filler may also be added to the mixture.

The positive electrode current collector is fabricated to a thickness from 3 μm to 500 μm. The positive electrode current collector may be used, as long as it has high conductivity and does not induce chemical changes in the battery. For example, stainless steel, aluminum, nickel, titanium, sintered carbon may be used, or aluminum or stainless steel surface-treated with carbon, nickel, titanium, silver, and so on may be used. The positive electrode current collector may have micro bumps on surface thereof to enhance adhesivity of the positive electrode active material, and may have a variety of forms such as film, sheet, foil, net, porous body, foam, nonwoven fabric, and so on.

Generally, the conducting agent is added in an amount of 1 wt % to 50 wt % based on the total weight of the mixture containing the positive electrode active material. The conducting agent may be used, as long as it has conductivity and does not induce chemical changes in the battery. For example, a conductive material such as, graphite such as natural graphite, artificial graphite, and so on; carbon black such as carbon black, acetylene black, Ketjen black (Trademark), carbon nanotubes, carbon nanofiber, channel black, furnace black, lamp black, thermal black, and so on; conductive fiber such as carbon fiber, metal fiber, and so on; metal powder such as fluorocarbon, aluminum, nickel powders, and so on; conductive whisker such as zinc oxide, potassium titanate, and so on; conductive metal oxide such as titanium oxide, and so on; polyphenylene derivative, and so on, may be used.

The binder promotes bonding between active material and the conducting agent, etc., or bonding of the active material to the current collector. Generally, the binder is added in an amount of 1 wt % to 50 wt % based on the total weight of the mixture containing the positive electrode active material. For example, a variety of copolymer such as polyvinylidene fluoride, polyvinyl alcohol, poolyimide, carboxymethyl cellulose (CMC), starch, hydroxypropyl cellulose, regenerated cellulose, polyvinylpyrrolidone, tetrafluoroethylene, polyethylene, polypropylene, ethylene-propylene-diene copolymer (EPDM), sulfonated EPDM, styrene-butylene rubber, fluoride rubber, may be used.

The filler is a component that suppresses expansion of the positive electrode and may be selectively used as long as it is fibrous and does not induce chemical changes in the battery. For example, it may be olefin-based polymer such as polyethylene, polypropylene, and so on; and a fibrous material such as glass fiber, carbon fiber, and so on.

(Negative Electrode)

The negative electrode uses the [negative electrode material for secondary battery] according to the present disclosure as a negative electrode active material.

For example, the negative electrode is fabricated by applying a mixture of the negative electrode active material described above, the conducting agent and the binder on the negative electrode current collector, and drying the same. Depending on needs, filler may also be added to the mixture.

The negative electrode current collector is fabricated to a thickness from 3 μm to 500 μm. The negative electrode current collector may be used, as long as it has conductivity and does not induce chemical changes in the battery. For example, copper, steel, stainless steel, aluminum, nickel, titanium, sintered carbon may be used, or copper or stainless steel surface-treated with carbon, nickel, titanium, silver, and so on, or aluminum-cadmium alloy may be used. Like the positive electrode current collector, the negative electrode current collector may have micro bumps on surface thereof to enhance adhesivity of the negative electrode active material, and may have a variety of forms such as film, sheet, foil, net, porous body, foam, nonwoven fabric, and so on.

The same conducting agent, binder, or filler as set forth above under (Positive electrode) may be used, but not limited thereto.

(Separator)

The separator is interposed between the positive electrode and the negative electrode. An insulative thin film having high ion permeability and mechanical strength is used. The separator generally has a pore diameter of 0.01 μm to 10 μm, and a thickness of 5 μm to 300 μm. For such separator, a sheet or a nonwoven fabric formed of, for example, olefin-based polymer such as chemically resistant or hydrophobic polypropylene, and so on; glass fiber or polyethylene, may be used. When the solid electrolyte such as polymer, and so on is used for the electrolyte, the solid electrolyte may act also as a separator.

(Nonaqueous Electrolyte)

The nonaqueous electrolyte is an electrolytic compound and may contain cyclic carbonate and/or linear carbonate. The example of the cyclic carbonate may include ethylene carbonate (EC), propylene carbonate (PC), gamma-Butyrolactone (GBL), fluoroethylene carbonate (FEC), and so on. The example of the linear carbonate may preferably include one or more selected from the group consisting of diethyl carbonate (DEC), dimethyl carbonate (DMC), ethyl methyl carbonate (EMC), and methyl propyl carbonate (MPC), but not limited thereto. Further, the nonaqueous electrolyte includes lithium salt as well as the carbonate compound, which may be preferably selected from the group consisting of $LiClO_4$, $LiCF_3SO_3$, $LiPF_6$, $LiBF_4$, $LiAsF_6$ and $LiN(CF_3SO_2)_2$ for example, but not limited thereto.

(Fabrication)

The secondary battery according to the present disclosure is fabricated with a general method of inserting a porous separator between positive electrode and negative electrode, and injecting nonaqueous electrolyte. The secondary battery according to the present disclosure may be used without being limited to any exterior shape (e.g., cylinder, rectangular, pouch-type, etc.).

Mode for Disclosure

Example

The present disclosure is described with reference to the Examples set forth below, but the scope of the present disclosure should not be construed as limiting to these Examples only.

Preparation of Negative Electrode Active Material

Example 1

The negative electrode active material was prepared in the order described below.
1) Preparation of Master Alloy Powder Starting powders (raw materials) were mixed with ratios of Si:Ni:Ti:Fe=60:14:24:2 (Composition 1), Si:Cr:Ti:Fe=73:13:12:2 (Composition 2), Si:Ni:Mn=62:19:19 (Composition 3), by weight %. After dissolving each at 1500° C. or higher, alloy foils were prepared with roll quenching, and then milled to a size less than 45 μm with ball mill.
2) Microcrystallization (First Mechanical Alloying Treatment)

The alloy powder was added with 1 wt % stearic acid as an agent, and placed into a receptacle of a vibrating mill along with 15 mm-diameter steel balls to fill 80% of the vibrating mill receptacle. After substitution with nitrogen gas, the first mechanical alloying treatment was conducted at 1200 cpm vibrating frequency for 6 hr and 24 hr, respectively.

The X-ray diffraction measurement of the obtained alloy powder was performed, and the crystallite sizes of the silicon of the alloy particles calculated by the Scherrer equation were tabulated into Table 1 below.

As indicated by Table 1, the crystallite size of silicon was not sufficiently reduced due to short treatment time, i.e., 6 hr, of the first mechanical alloying treatment, while the entire compositions of Example 1 were reduced to 5 nm or less with the 24-hour first mechanical alloying treatment.

All the Examples below describe when the first mechanical alloying treatment was performed for 24 hr.

TABLE 1

| Starting powder compositions | Crystallite size of silicon by 6-hour first mechanical alloying treatment (nm) | Crystallite size of silicon by 24-hour first mechanical alloying treatment (nm) |
| --- | --- | --- |
| Composition 1 | 45.4 | 3.5 |
| Composition 2 | 7.3 | Unmeasurable (≈0) |
| Composition 3 | 39.6 | 2.8 |

3) Preparation of Negative Electrode Material by Compositing (Second Mechanical Alloying Treatment)

The alloy powder obtained from the first mechanical alloying treatment (refinement process) were mixed with artificial graphite powder with average particle diameter of 5 μm at 90:10 (wt %), and again subjected to mechanical alloying treatment for 1 hr, at 1200 cpm, with 5 mm-diameter steel balls filling 40% of the vibrating mill, and as a result, the alloy particles and the artificial graphite powder were milled and composited. The produced composite material (negative electrode material) had an average particle diameter of 2.0 μm (Composition 1), 4.3 μm (Composition 2), and 4.1 μm (Composition 3).
4) Preparation of Electrode & Battery The obtained alloy-carbon composite material was mixed with graphite of average particle diameter of 15 μm with weight ratio of 40:60, and thus prepared into negative electrode active material. A mixture of 94 wt % of the negative electrode active material, 2 wt % of multilayer carbon nanotubes (average particle diameter: 20 nm, average length: 2 μm) as the conducting agent, and 4 wt % of polyvinylidene fluoride as the binder, was prepared and formed into slurry with N-methyl-2-pyrrolidone, which was applied onto 20 μm-thick copper foil to a thickness of approximately 100 μm. After vacuum-drying at 120° C. and pressing, a negative electrode of electrode density of 1.7 g/cc was prepared by punching out a 13 mm-diameter disc. Using the punched negative electrode and 0.3 mm-thick metal lithium as an opposite polarity, and using an electrolyte of ethylene carbonate:diethyl carbonate (3:7) mixtures containing 1 mol lithium hexafluorophosphate ($LiPF_6$), 2016-type coin cell was fabricated.

Example 2

The coin cell was fabricated in the same sequence as Example 1, except for using 15 mm-size balls for the second mechanical alloying of Example 1.

Example 3

The coin cell was fabricated in the same sequence as Example 1, except for using acetylene black rather than multilayer carbon nanotubes for the fabrication of electrode in Example 1.

Comparative Example 1

The coin cell was fabricated in the same sequence as Example 1, except for omitting the second mechanical alloying of Example 1.

Comparative Example 2

The coin cell was fabricated in the same sequence as Example 1, except for treating the alloy powder with 10% artificial graphite along with 15 mm steel balls for the first mechanical alloying of Example 1 and omitting the second mechanical alloying.

<Evaluation Test 1: Charge/Discharge Cycle Test>

The coin cells (secondary batteries) of Examples and Comparative Examples were subjected to repeated 50 cycle charging/discharging at 0.5 C current rate.

After finishing the test at the 51st charge cycle state, the coin cells were disassembled and the thickness of the electrodes was measured. The thickness was divided by (discharge capacity per unit weight at 50th cycle×weight of active material containing conducting agent per unit area as measured before charging). As a result, volume of the mixed active material layer per capacity at the 51st charge cycle state was calculated. Further, the crystallite size of silicon was calculated with the Bruker D2 Phase X-ray diffractometer using CuKα radiation, based on the X-ray diffraction silicon (111) peak full width at half maximum (FWHM), by using Scherrer equation. Table 2 below lists the result.

TABLE 2

| | Composition | Initial efficiency (%) | Capacity retention (%) after 50th cycle | Average particle diameter (μm) | Electrode volume per capacity during 51st cycle charging (Relative value to Example 1)(%) |
| --- | --- | --- | --- | --- | --- |
| Ex. 1 | 1 | 89.1 | 98.1 | 2.0 | 100 |
| | 2 | 88.9 | 97.9 | 4.3 | 100 |
| | 3 | 88.8 | 97.5 | 4.1 | 100 |

TABLE 2-continued

| | Composition | Initial efficiency (%) | Capacity retention (%) after 50th cycle | Average particle diameter (μm) | Electrode volume per capacity during 51st cycle charging (Relative value to Example 1)(%) |
|---|---|---|---|---|---|
| Ex. 2 | 1 | 89.3 | 93.5 | 12.5 | 106 |
| | 2 | 89.0 | 91.8 | 18.1 | 112 |
| | 3 | 89.0 | 91.0 | 16.9 | 115 |
| Ex. 3 | 1 | 88.7 | 86.6 | 2.0 | 128 |
| | 2 | 88.5 | 83.0 | 4.3 | 133 |
| | 3 | 88.1 | 83.4 | 4.0 | 130 |
| Comp. Ex. 1 | 1 | 89.2 | 85.9 | 15.9 | 112 |
| | 2 | 89.0 | 82.7 | 13.8 | 107 |
| | 3 | 89.9 | 79.2 | 14.5 | 123 |
| Comp. Ex. 2 | 1 | 79.0 | 92.3 | 20.0 | 106 |
| | 2 | 78.6 | 90.3 | 21.2 | 108 |
| | 3 | 78.4 | 88.1 | 19.7 | 110 |

<Evaluation Test 2: Current Rate Test>

Apart from the charging/discharging test described above, the coin cells (i.e., secondary batteries) of Example 1 and Comparative Example 1 were subjected to charging/discharging at current rates of 0.1 C, 0.2 C, 0.5 C, 1 C, during which discharge capacity was measured. Table 3 below lists the result.

TABLE 3

| Example | 0.2 C | 0.5 C | 1.0 C |
|---|---|---|---|
| Ex. 1 | 99.9 | 99.1 | 98.0 |
| Comp. Ex. 1 | 99.4 | 98.4 | 95.2 |

<Overall Evaluation>

According to the present disclosure, alloy particles are microcrystallized and composited with carbonaceous material, and microparticles of average particle diameter of several μm or lower are formed. Accordingly, since expansion is reduced, conductivity is enhanced, and electrode homogeneity is enhanced, the overall thickness of the electrode can be reduced. Further, by compositing of the alloy particles with the carbonaceous material, the current rate characteristic is enhanced.

Meanwhile, as in the case of Comparative Example 2, when the carbonaceous material is added in the stage of the first mechanical alloying treatment, desired secondary battery is not obtained because of considerably deteriorated initial efficiency due to reasons such as misalignment of carbonaceous material structure, increased specific surface area, and so on. Compared to the above, Example 1 can provide high initial efficiency by performing compositing with the carbonaceous material in the second mechanical alloying with separate, low power.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A negative electrode material for a secondary battery capable of intercalating and de-intercalating lithium, wherein the negative electrode material consists of alloy particles including a silicon phase and a metal phase, and a carbonaceous material, wherein the silicon phase has a crystallite size of 10 nm or less,
the metal phase comprises two or more kinds of metals alloying with silicon but not with lithium,
the carbonaceous material has a crystallite size of 30 nm or more, and
the carbonaceous material is present on a surface of, or within the alloy particles.

2. The negative electrode material of claim 1, wherein the two or more kinds of metals are a combination of two or more kinds of metals selected from the group consisting of Co, Cr, Cu, Fe, Mn, Mo, Ni, Ti.

3. The negative electrode material of claim 1, wherein the crystallite size of the metal phase is 30 nm or less.

4. The negative electrode material of claim 1, wherein 50% diameter in a volume cumulative particle size distribution of the negative electrode material is from 1 μm to 5 μm, and
90% diameter in the volume cumulative particle size distribution of the negative electrode material is from 8 μm to 30 μm.

5. The negative electrode material of claim 1, wherein content of the silicon included in the alloy particles is from 40 wt % to 85 wt %.

6. The negative electrode material of claim 1, wherein content of the carbonaceous material included in the alloy particles is from 1 wt % to 20 wt %.

7. The negative electrode material of claim 1, wherein, with respect to a weight (100) of silicon included in the entire alloy particles, a ratio of silicon of the silicon phase is from 20 wt % to 70 wt %.

8. A negative electrode for a secondary battery comprising the negative electrode material as set forth in claim 1.

9. The negative electrode of claim 8, further comprising carbon nanotubes as a conducting agent.

10. The negative electrode of claim 9, wherein the conducting agent is included in an amount from 0.1 wt % to 5 wt % with respect to a total weight of the negative electrode for a secondary battery.

11. A secondary battery, comprising a positive electrode, a negative electrode, a nonaqueous electrolyte, and a separator, wherein the negative electrode is as set forth in claim 7.

12. The secondary battery of claim 11, wherein the secondary battery is a lithium secondary battery.

13. A fabricating method of the negative electrode material for a secondary battery as set forth in claim 1, the fabricating method comprising:
preparing silicon, two or more kinds of metals alloying with silicon but not with lithium, and a carbonaceous material;
forming the silicon and the two or more kinds of metals into a master alloy;
forming microcrystallized alloy particles consisting of a silicon phase having a crystallite size of 10 nm or less, and a metal phase, by subjecting the master alloy to a first mechanical alloying treatment;
subjecting the microcrystallized alloy particles and the carbonaceous material to a second mechanical alloying; and
incorporating the carbonaceous material onto a surface of, or into the alloy particles.

14. The fabricating method of claim 13, wherein forming of the master alloy is performed by liquid quenching.

15. The fabricating method of claim 13, wherein the second mechanical alloying treatment is performed at a lower energy than the first mechanical alloying treatment.

* * * * *